United States Patent
Minato

(10) Patent No.: US 10,876,887 B2
(45) Date of Patent: Dec. 29, 2020

(54) SPECTROSCOPIC DETECTOR

(71) Applicant: Shimadzu Corporation, Kyoto (JP)

(72) Inventor: Hiroyuki Minato, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 90 days.

(21) Appl. No.: 16/441,081

(22) Filed: Jun. 14, 2019

(65) Prior Publication Data

US 2020/0049553 A1    Feb. 13, 2020

(30) Foreign Application Priority Data

Aug. 10, 2018  (JP) .................. 2018-151002

(51) Int. Cl.
   *G01J 3/28*  (2006.01)
   *G01J 3/02*  (2006.01)
   *G01J 3/18*  (2006.01)
   *G01J 3/26*  (2006.01)

(52) U.S. Cl.
   CPC ........... *G01J 3/0202* (2013.01); *G01J 3/18* (2013.01); *G01J 3/26* (2013.01); *G01J 3/28* (2013.01)

(58) Field of Classification Search
   CPC .... G01J 3/0202; G01J 3/18; G01J 3/42; G01J 3/027; G01J 3/28; G01J 3/02; G01N 30/74
   See application file for complete search history.

(56) References Cited

U.S. PATENT DOCUMENTS

2007/0291266 A1*  12/2007  Handa .................. G01J 3/18
                                                          356/328
2016/0258913 A1      9/2016  Uchiho et al.

FOREIGN PATENT DOCUMENTS

JP    2016-161455    9/2016

* cited by examiner

*Primary Examiner* — Abdullahi Nur
(74) *Attorney, Agent, or Firm* — Muir Patent Law, PLLC

(57) ABSTRACT

A spectroscopic detector includes a light source, a flow cell, a diffraction grating, a diffraction grating drive unit, an optical sensor and a diffraction grating position adjustment unit. The diffraction grating drive unit is configured to adjust a rotation position of the diffraction grating within a range that light of a specified wavelength region of plus side diffracted light and light of the specified wavelength region of minus side diffracted light among diffracted light caused by the diffraction grating is selectively guided to the flow cell. The diffraction grating position adjustment unit is configured to adjust the rotation position of the diffraction grating unit in order to selectively guide one of the light of the specified wavelength region of the plus side diffracted light and the light of the specified wavelength region of the minus side diffracted light among the diffracted light caused by the diffraction grating.

5 Claims, 3 Drawing Sheets

SPECTROSCOPIC DETECTOR

TECHNICAL FIELD

The present invention relates to a spectroscopic detector in which light emitted by a light source is dispersed by a diffraction grating, the light of a specified wavelength region among diffracted light caused by the diffraction grating is guided to a flow cell, and light emitted from the flow cell due to the light guided to the flow cell is detected by an optical sensor.

BACKGROUND ART

As a detector for a liquid chromatograph, a spectroscopic detector, such as, e.g., a UV absorbance detector and a fluorescence spectroscopic detector, is known. The UV absorbance detector is configured to measure the absorbance of a sample flowing through a flow cell by guiding light from a light source to a diffraction grating, dispersing the light into diffracted light for each wavelength component, guiding only the light of a measurement wavelength region among dispersed diffracted light by the diffraction grating to a flow cell, and detecting the intensity of the light that has transmitted through the flow cell with an optical sensor (see, for example, Patent Document 1).

PRIOR ART

Patent Document
Patent Document 1: Japanese Unexamined Patent Application Publication No. 2016-161455

SUMMARY OF THE INVENTION

Problems to be Solved by the Invention

Among samples to be measured by a spectroscopic detector as described above, there exist substances which will be decomposed or altered by being irradiated with light. Among them, it was found that there exists a substance which rapidly causes decomposition and/or alteration at the moment when the substance flows into a flow cell and is irradiated with light, resulting in an abnormal measurement result. Then, the inventor of the present application has found the fact that the degree of such decomposition or alteration of the substance increases as the intensity of light irradiated to the substance increases.

In order to suppress decomposition or alteration of a sample due to light irradiation, it is also conceivable to place a neutral density filter on the optical path between the light source and the flow cell to reduce the amount of light incident on the flow cell. However, such measures are necessary only for specific samples that are likely to cause decomposition and/or alteration due to light. If a neutral density filter is used at the time of measuring other samples, there are problems that the strength of the detector signal reduces, resulting in a reduced S/N. For this reason, it is necessary to configure such that a neutral density filter is placed on and removed from the optical path. In order to make it automatic, it is required to provide a dedicated attachment/detachment mechanism of the neutral density filter, which may increase costs.

The present invention has been made in view of the above-described problems and aims to provide a spectroscopic detector capable of changing intensity of light for measurement as needed without providing a neutral density filter or a dedicated attachment/detachment mechanism therefor.

Means for Solving the Problems

A spectroscopic detector according to the present invention includes:
a light source;
a flow cell having an internal space through which a sample flows;
a diffraction grating configured to disperse light from the light source so that intensity of one of plus side diffracted light and minus side diffracted light is higher than intensity of the other thereof;
a diffraction grating drive unit configured to adjust a rotation position of the diffraction grating within a range that light of a specified wavelength region of the plus side diffracted light and light of the specified wavelength region of the minus side diffracted light among diffracted light caused by the diffraction grating is selectively guided to the flow cell;
an optical sensor configured to detect light emitted from the flow cell due to light guided to the flow cell from the diffraction grating; and
a diffraction grating position adjustment unit configured to adjust the rotation position of the diffraction grating unit by controlling an operation of the diffraction grating drive unit in order to selectively guide one of the light of the specified wavelength region of the plus side diffracted light and the light of the specified wavelength region of the minus side diffracted light among the diffracted light caused by the diffraction grating.

The spectroscopic detector according to the present invention is a so-called pre-dispersive type spectroscopic detector in which light from a light source is dispersed at the front stage side of a flow cell through which a sample flows using a diffraction grating. When light is irradiated to the diffraction grating, the $n^{th}$ order diffracted light ($+1^{st}$ order diffracted light, $+2^{nd}$ order diffracted light, . . . , $-1^{st}$ order diffracted light, $-2^{nd}$ order diffracted light, . . . ) is generated on each of the plus side and the minus side centering the 0th order light. In the spectroscopic detector, the diffraction grating is generally configured such that the diffraction grating is designed so that one of the plus side diffracted light and the minus side diffracted light is higher in intensity than the other in order to obtain the high signal strength and that the high intensity diffracted light (e.g., +1" order diffracted light) is used for measurement. For example, in Patent Document 1 (Japanese Patent Application Publication No. 2016-161455), it is disclosed that +1" order diffracted light is used for measurement and light other than $+1^{st}$ order diffracted light, such as, e.g., $-1^{st}$ order diffracted light, is used as reference light.

The present invention is characterized in that it is configured such that both the plus side diffracted light and the minus side diffracted light are used for measurement as needed. With this feature, it is possible to selectively use such that for example, in cases where the plus side diffracted light is designed to be higher in intensity than the minus side diffracted light, when measuring a sample having a property of being likely to be decomposed or altered due to light irradiation, the minus side diffracted light is used for the measurement, and when measuring a sample not having such a property, the plus side diffracted light is used for measurement. This eliminates the need for attaching and detaching a neutral density filter on the front stage side of the flow cell.

In a preferred embodiment of the present invention, the spectroscopic detector further includes a measurement condition setting unit configured to set a level of intensity of light guided to the flow cell as a measurement condition along with a measurement wavelength, wherein the diffraction grating position adjustment unit is configured to control the operation of the diffraction grating drive unit so as to adjust the rotation position of the diffraction grating in which diffracted light higher in intensity between the plus side diffracted light and the minus side diffracted light is guided to the flow cell when the intensity of light is set to high in the measurement condition setting unit, and wherein the diffraction grating position adjustment unit is configured to control the operation of the diffraction grating drive unit so as to adjust the rotation position of the diffraction grating in which diffracted light lower in intensity between the plus side diffracted light and the minus side diffracted light is guided to the flow cell when the intensity of light is set to low in the measurement condition setting unit.

Further, in a preferred embodiment, the spectroscopic detector further includes a calibration information holding unit configured to hold information on a correlation between the rotation position of the diffraction grating and a wavelength of the light guided to the flow cell as calibration information for both a plus side region of the diffracted light and a minus side region of the diffracted light caused by the diffraction grating.

Further, in the present invention, the spectroscopic detector may further include an alteration characteristic measurement unit configured to guide the light of the specified wavelength region of the plus side diffracted light and the light of the specified wavelength region of the minus side diffracted light of the diffracted light caused by the diffraction grating to the flow cell at different timings in order to measure alteration characteristics of the sample in a state in which a measurement target sample flows through the flow cell, and obtain a detection signal of the optical sensor when the light of the specified wavelength region of the plus side diffracted light is being guided to the flow cell and a detection signal of the optical sensor when the light of the specified wavelength region of the minus side diffracted light is being guided to the flow cell. With this, it is possible to give the spectroscopic detector a function that measures whether or not a sample has a characteristic of likely being decomposed or altered by irradiation of light.

In the preferred embodiment of the above-described case, the alteration characteristic measurement unit is configured to judge whether or not a difference between the detection signal of the optical sensor when the light of the specified wavelength region of the plus side diffracted light is being guided to the flow cell and the detection signal of the optical sensor when the light of the specified wavelength region of the minus side diffracted light is being guided to the flow cell, determine that the sample is likely to be decomposed or altered by light when the difference is equal to or greater than a predetermined value, and determine that the sample is unlikely to be decomposed or altered by light when the difference is less than the predetermined value, when it is determined that the sample is unlikely to be decomposed or altered by light, the diffraction grating position adjustment unit controls the operation of the diffraction grating drive unit so as to adjust the rotation position of the diffraction grating to a position in which the diffracted light higher in intensity between the positive side diffracted light and the minus side diffracted light is guided to the flow cell, and when it is determined that the sample is likely to be decomposed or altered by light, the diffraction grating position adjustment unit controls the operation of the diffraction grating drive unit so as to adjust the rotation position of the diffraction grating to a position in which the diffracted light lower in intensity between the positive side diffracted light and the minus side diffracted light is guided to the flow cell.

Effects of the Invention

In the spectroscopic detector according to the present invention, both of the plus side diffracted light and the minus side diffracted light caused by the diffraction grating can be used for measurement as needed. Therefore, it is possible to selectively use high intensity diffracted light and low intensity diffracted light, which eliminates the need for attaching and detaching a neutral density filter on the front stage side of the flow cell.

BRIEF DESCRIPTION OF THE DRAWINGS

FIG. 2A and FIG. 2B are views showing a relationship between a rotation position of a diffraction grating and light guided to a flow cell in the embodiment, wherein FIG. 2A is a rotation position of the diffraction grating when the plus side diffracted light is guided to the flow cell, and FIG. 2B is a rotation position of the diffraction grating when the minus side diffracted light is guided to the flow cell.

EMBODIMENTS FOR CARRYING OUT THE INVENTION

Hereinafter, an embodiment of a spectroscopic detector according to the present invention will be described with reference to the drawings.

Figure 1:
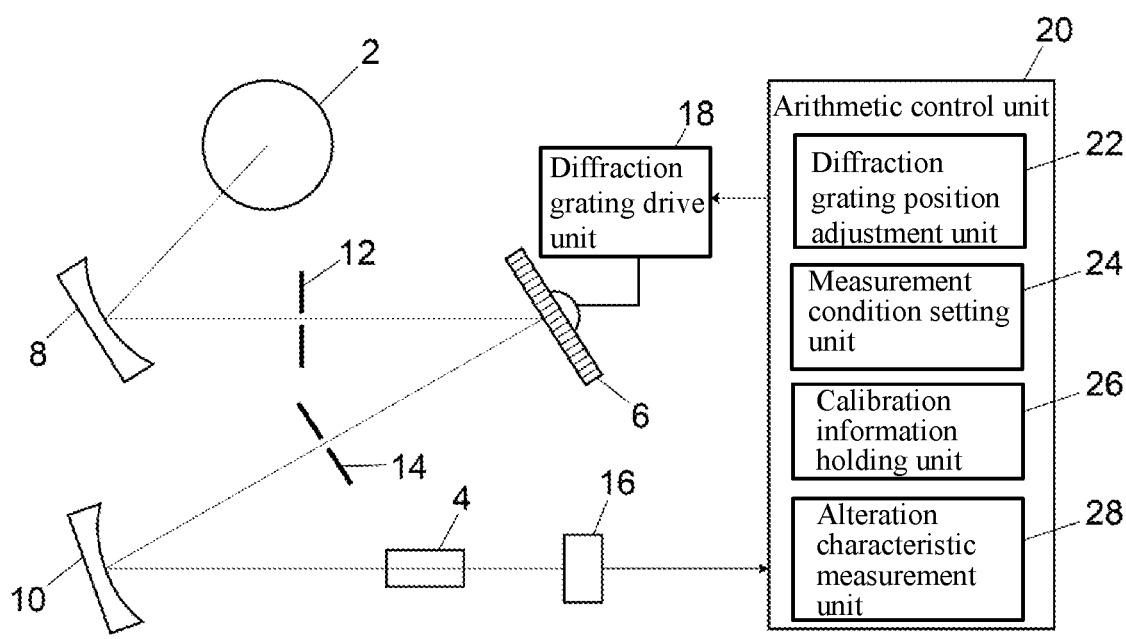
FIG. 1 is a schematic block diagram showing one embodiment of a spectroscopic detector.

As shown in FIG. 1, the spectroscopic detector of this embodiment is provided with a light source 2, a flow cell 4, a diffraction grating 6, mirrors 8 and 10, slits 12 and 14, an optical sensor 16, a diffraction grating drive unit 18, and an arithmetic control unit 20.

The light emitted from the light source 2 is reflected by the mirror 8 and incident on the diffraction grating 6 through the slit 12. The light incident on the diffraction grating 6 through the slit 12 is dispersed, and an $n^{th}$ order diffracted light is generated on the plus side and the minus side centering on the 0th order light. The diffraction grating 6 is designed such that the intensity of one of the plus side diffracted light and the minus side diffracted light is higher than that of the other side.

Figure 2A:
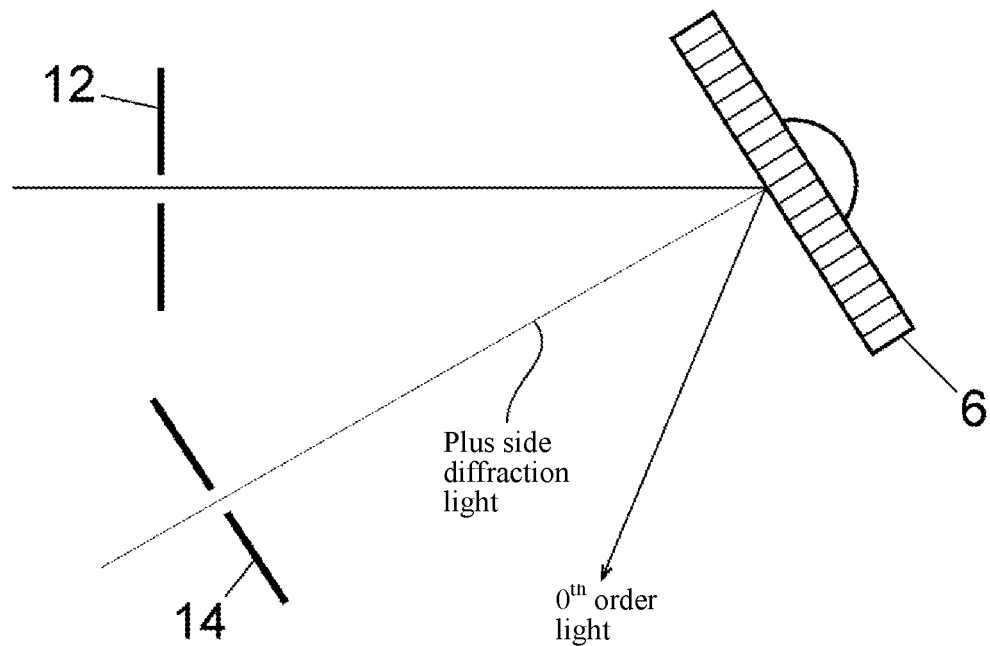
Figure 2B:
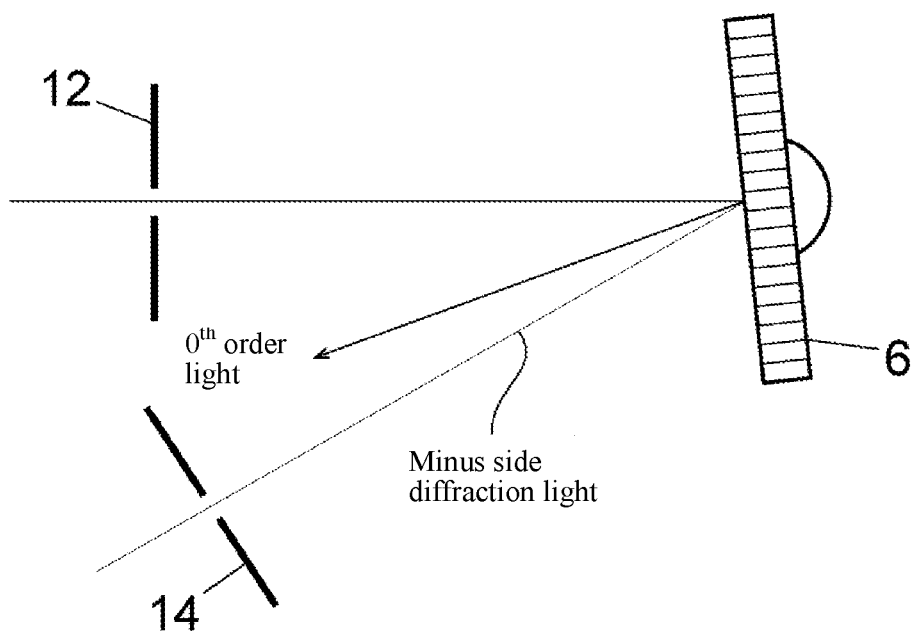

The diffraction grating 6 is rotationally driven by the diffraction grating drive unit 18 composed of a stepping motor or the like so that the wavelength region of the light passing through the slit 14 is adjusted by the rotation position of the diffraction grating 6. The diffraction grating 6 is rotated within a range that the light of any wavelength region from the diffracted light of both the plus side region and the minus side region can be selectively made to pass through the slit 14. That is, the diffraction grating 6 can be rotated by the diffraction grating drive unit 18 to a position where the positive side diffracted light, such as, e.g., $+1^{st}$ order diffracted light among the diffracted light generated at the diffraction grating 6, is made to pass through the slit 14 as shown in FIG. 2A, and can also be rotated to a position where the minus side diffracted light, such as, e.g., $-1^{st}$ order diffracted light among the diffracted light generated at the diffraction grating 6, is made to pass through the slit 14.

The light that has passed through the slit 14 is reflected by the mirror 10 and guided to the flow cell 4. The flow cell 4 has, at its inside, a space for flowing a sample solution. Although the illustration is omitted, the flow cell 4 is provided with an inlet and an outlet communicating with the internal space, and the inlet is connected to, for example, the outlet of a separation column of a liquid chromatograph.

Note that although the illustration is omitted, it may be configured such that a beam splitter is provided on the optical path between the light source 2 and the flow cell 4 so as to take out a part of measurement light as reference light.

The optical sensor 16 is provided at a position for receiving the light transmitted through the flow cell 4. The detection signal of the optical sensor 16 is introduced into the arithmetic control unit 20. The arithmetic control unit 20 is configured to perform the operation control of the spectroscopic detector and perform various arithmetic processing based on the detection signal from the optical sensor 16. The arithmetic control unit 20 is realized by a dedicated computer or a general-purpose personal computer.

The arithmetic control unit 20 is provided with a diffraction grating position adjustment unit 22, a measurement condition setting unit 24, a calibration information holding unit 26, and an alteration characteristic measurement unit 28. The diffraction grating position adjustment unit 22, the measurement condition setting unit 24, and the alteration characteristic measurement unit 28 are functions realized by executing a predetermined program by the arithmetic element of the arithmetic control unit 20. The calibration information holding unit 26 is a function realized by a part of the storage area in the storage device provided in the arithmetic control unit 20.

The diffraction grating position adjustment unit 22 is configured to control the diffraction grating drive unit 18 so that the light of an arbitrary wavelength region of the diffracted light of either the plus side diffracted light or the minus side diffracted light among the diffracted light caused by the diffraction grating 6 is made to pass through the slit 14 to be guided to the flow cell. In the calibration information holding unit 26, the information on the correlation between the rotation position of the diffraction grating 6 and the wavelength region of the light guided to the flow cell 4 through the slit 14 for each of the plus side region and the minus side region of the diffracted light caused by the diffraction grating 6 is held as calibration information. That is, this spectroscopic detector is configured to perform the wavelength calibration for obtaining the information on the correlation between the rotation position of the diffraction grating 6 and the wavelength region of the light to be guided to the flow cell 4 for each of the diffracted light of the plus side region and the diffracted light of the minus side region. The calibration information of the plus side region calibration information and the minus side region calibration information acquired by the wavelength calibration are held in the calibration information holding unit 26.

The diffraction grating position adjustment unit 22 is configured to control the operation of the diffraction grating drive unit 18 so that the light of the wavelength region set by the measurement condition setting unit 24 is extracted from the plus side diffracted light or the minus side diffracted light and guided to the flow cell 4 based on the calibration information held in the calibration information holding unit 26.

The measurement condition setting unit 24 is configured to set the measurement conditions, such as, e.g., the measurement wavelength and the level of the intensity of the measurement light to the flow cell 4 (whether the sample flowing through the flow cell 4 is likely to cause decomposition or alternation by light), based on the user input.

For example, in cases where the diffraction grating 6 is designed so that the plus side diffracted light is higher in intensity than the minus side diffracted light and the 2nd order diffracted light is used as measurement light, when the measurement condition setting unit 24 sets the measurement wavelength to 350 nm and the intensity of the measurement light to "high" based on the user input, the diffraction grating position adjustment unit 22 controls the diffraction grating drive unit 18 to adjust the rotation position of the diffraction grating 6 so that the light of the wavelength region including 350 nm among the +2nd order diffracted light passes through the slit 14 and is guided to the flow cell 4. On the other hand, when the measurement condition setting unit 24 has set the intensity of the measurement light to "low", the diffraction grating position adjustment unit 22 controls the diffraction grating drive unit 18 to adjust the rotation position of the diffraction grating 6 so that the light of the wavelength region including 350 nm among the minus $-2^{nd}$ order diffracted light passes through the slit 14 and is guided to the flow cell 4.

Thus, the spectroscopic detector of this embodiment can selectively use the plus side diffracted light and the minus side diffracted light as needed, and can change the intensity of the light irradiated to the flow cell 4 without using a neutral density filter or the like.

The alteration characteristic measurement unit 28 is configured to measure the easiness that a sample causes decomposition and alteration due to light as the alternation characteristics, using the light of the same wavelength region of the plus side diffracted light and the minus side diffracted light which are different in intensity from each other.

Figure 3:
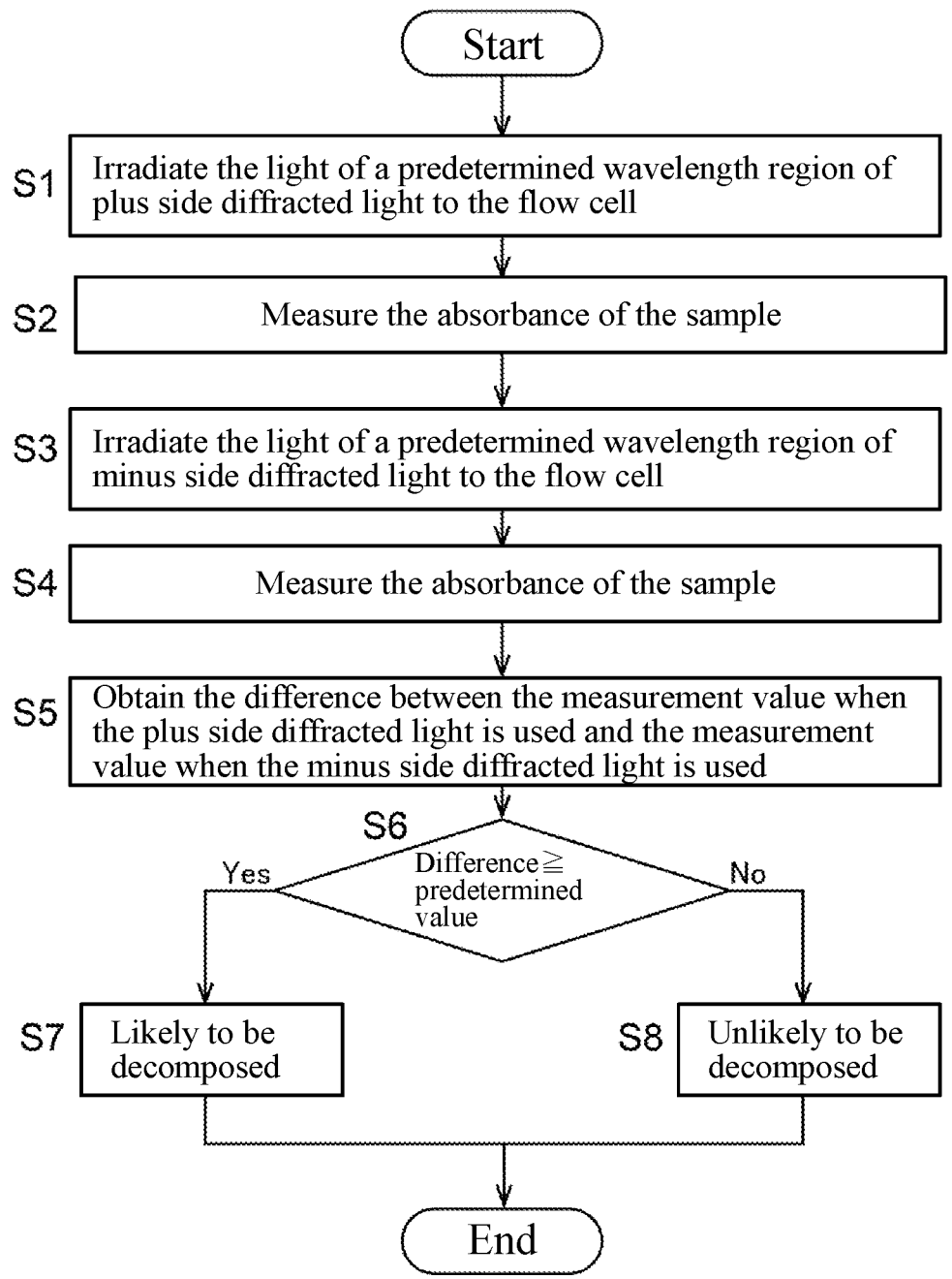
FIG. 3 is a flowchart showing an operation of alteration characteristic measurement of a sample.

For example, as shown in FIG. 3, the measurement of the alteration characteristics is performed by irradiating the flow cell 4 with the light of the specified wavelength region of the plus side diffracted light (Step S1) and measuring the absorbance of the measurement target sample (Step S2). Next, the light of the specified wavelength region of the minus side diffracted light is irradiated to the flow cell 4 (Step S3), and the absorbance of the measurement target sample is measured (Step S4). The difference between the absorbance measured in Step S2 and the absorbance measured in S4 is obtained (Step S5). It can be said that a sample with a larger difference in absorbance is more likely to cause decomposition and/or alteration by light. By setting a reference to this difference value, it can be determined whether or not the sample has the property of being likely to cause decomposition and/or alteration. In the example of FIG. 3, it is determined that alteration easily occurs when the difference is equal to or more than a predetermined value, and it is determined that alteration is less likely to occur when the difference is less than the predetermined value.

Note that the alteration characteristic measurement unit 28 is not an essential constituent element. Therefore, the spectroscopic detector is not always required to have the function of the alteration characteristic measurement unit 28.

Note that, in the above-described embodiment, an absorbance detector is described as an example of the spectroscopic detector, but the present invention is not limited thereto. The spectroscopic detector can also be applied to a fluorescence detector which emits excitation light to a sample flowing through the flow cell 4 and detects the fluorescence emitted from the excited sample by an optical sensor.

DESCRIPTION OF REFERENCE SYMBOLS 2 light source
4 flow cell
6 diffraction grating
8, 10 mirror
12, 14 slit
16 optical sensor
18 diffraction grating drive unit
20 arithmetic control unit
22 diffraction grating position adjustment unit
24 measurement condition setting unit
26 calibration information holding unit
28 alteration characteristic measurement unit

The invention claimed is:

1. A spectroscopic detector comprising:
a light source;
a flow cell having an internal space through which a sample flows;
a diffraction grating configured to disperse light from the light source so that intensity of one of plus side diffracted light and minus side diffracted light is higher than intensity of the other thereof;
a diffraction grating drive unit configured to adjust a rotation position of the diffraction grating within a range that light of a specified wavelength region of the plus side diffracted light and light of the specified wavelength region of the minus side diffracted light among diffracted light caused by the diffraction grating is selectively guided to the flow cell;
an optical sensor configured to detect light emitted from the flow cell due to light guided to the flow cell from the diffraction grating; and
a diffraction grating position adjustment unit configured to adjust the rotation position of the diffraction grating by controlling an operation of the diffraction grating drive unit in order to selectively guide one of the light of the specified wavelength region of the plus side diffracted light and the light of the specified wavelength region of the minus side diffracted light among the diffracted light caused by the diffraction grating.

2. The spectroscopic detector as recited in claim 1, further comprising a measurement condition setting unit configured to set a level of intensity of light guided to the flow cell as a measurement condition along with a measurement wavelength,
wherein the diffraction grating position adjustment unit is configured to control the operation of the diffraction grating drive unit so as to adjust the rotation position of the diffraction grating in which diffracted light higher in intensity between the plus side diffracted light and the minus side diffracted light is guided to the flow cell when the intensity of light is set to high in the measurement condition setting unit, and
wherein the diffraction grating position adjustment unit is configured to control the operation of the diffraction grating drive unit so as to adjust the rotation position of the diffraction grating in which diffracted light lower in intensity between the plus side diffracted light and the minus side diffracted light is guided to the flow cell when the intensity of light is set to low in the measurement condition setting unit.

3. The spectroscopic detector as recited in claim 1, further comprising a calibration information holding unit configured to hold information on a correlation between the rotation position of the diffraction grating and a wavelength of the light guided to the flow cell as calibration information for both a plus side region of the diffracted light and a minus side region of the diffracted light caused by the diffraction grating.

4. The spectroscopic detector as recited in claim 1, further comprising an alteration characteristic measurement unit configured to guide the light of the specified wavelength region of the plus side diffracted light and the light of the specified wavelength region of the minus side diffracted light of the diffracted light caused by the diffraction grating to the flow cell at different timings in order to measure alteration characteristics of the sample in a state in which a measurement target sample flows through the flow cell, and obtain a detection signal of the optical sensor when the light of the specified wavelength region of the plus side diffracted light is being guided to the flow cell and a detection signal of the optical sensor when the light of the specified wavelength region of the minus side diffracted light is being guided to the flow cell.

5. The spectrophotometer as recited in claim 4,
wherein the alteration characteristic measurement unit is configured to judge whether or not a difference between the detection signal of the optical sensor when the light of the specified wavelength region of the plus side diffracted light is being guided to the flow cell and the detection signal of the optical sensor when the light of the specified wavelength region of the minus side diffracted light is being guided to the flow cell, determine that the sample is likely to be decomposed or altered by light when the difference is equal to or greater than a predetermined value, and determine that the sample is unlikely to be decomposed or altered by light when the difference is less than the predetermined value,
wherein, when it is determined that the sample is unlikely to be decomposed or altered by light, the diffraction grating position adjustment unit controls the operation of the diffraction grating drive unit so as to adjust the rotation position of the diffraction grating to a position in which the diffracted light higher in intensity between the positive side diffracted light and the minus side diffracted light is guided to the flow cell, and
wherein, when it is determined that the sample is likely to be decomposed or altered by light, the diffraction grating position adjustment unit controls the operation of the diffraction grating drive unit so as to adjust the rotation position of the diffraction grating to a position in which the diffracted light lower in intensity between the positive side diffracted light and the minus side diffracted light is guided to the flow cell.

* * * * *